(No Model.)
W. B. DEVEREUX.
SLAG BUGGY.
No. 312,439. Patented Feb. 17, 1885.
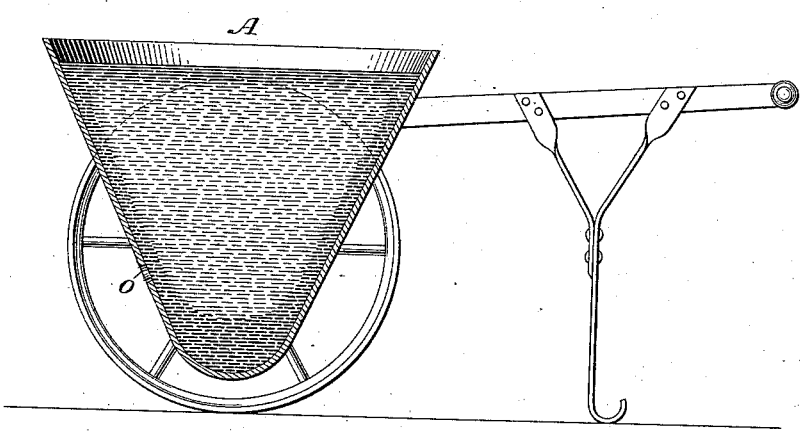
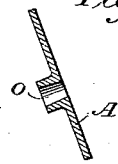
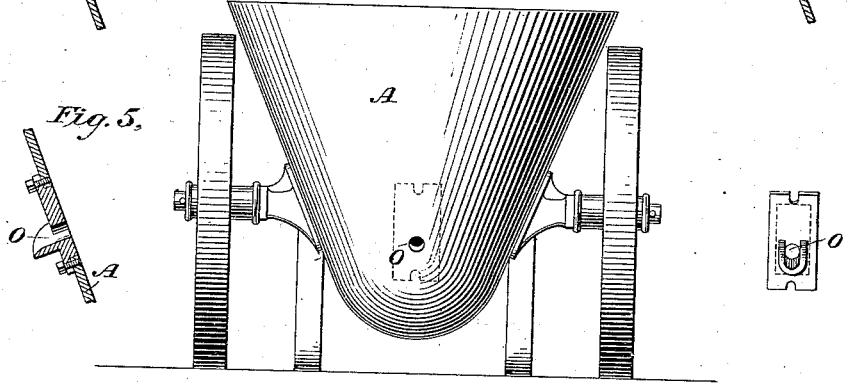
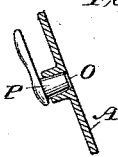
Witnesses
Wm A. Skinkle
Geo. W. Breck
Inventor
Walter B. Devereux,
By his Attorney
Willard Parker Butler

UNITED STATES PATENT OFFICE.

WALTER B. DEVEREUX, OF ASPEN, COLORADO.

SLAG-BUGGY.

SPECIFICATION forming part of Letters Patent No. 312,439, dated February 17, 1885.

Application filed November 11, 1884. (No model.)

*To all whom it may concern:*

Be it known that I, WALTER B. DEVEREUX, a citizen of the United States, residing at Aspen, in the county of Pitkin and State of Colorado, have invented a new and useful Improvement in Slag-Buggies, of which the following is a specification.

My invention relates to that class of slag-buggies which are used for the removal of slag in lead, silver, copper, and other smelting-works; and the object of my invention is to provide an easy, economical, and effectual method of separating the rich slags and mattes collected in the buggy from the poor slag. This I accomplish by means of the contrivance shown in the accompanying drawings, which are to be taken as a part of this specification, and in which—

Figure 1 is a vertical cross-section of the buggy; Fig. 2, a front view; and Figs. 3, 4, and 5 views of details.

Similar letters refer to similar parts throughout the several views.

Heretofore it has been the practice in smelting-works to separate the rich slags and mattes from the poor slags by hand after cooling. When slag is tapped from the furnace into the usual form of conical slag-buggy, such as shown in Fig. 1, the mass as it comes in contact with the iron shell of the buggy is immediately cooled, and a layer or crust of cool slag also forms upon the upper surface of the slag and rises with the same as the pot is gradually filled. When the slag-pot is full, there is an exterior shell of partially-solidified slag and a crust of the same character on the upper surface. The slag contained in the interior remains liquid for some time.

In the process of smelting in which mattes, speisses, or metal are drawn off with the slag, either intentionally or otherwise, the following results are liable to occur: The larger portions of the mattes or metals, by reason of their greater specific gravity, settle in the liquid slag into a layer at the bottom of the buggy, while many small globules of the mattes, metals, &c., in their descent, come in contact with the layer of cooling slag next to the iron of the slag-pot, and, owing to the viscous condition of the cool slag, become enveloped and finally fixed in the exterior layer.

When the slag-buggy is filled under the above-described conditions and the mass allowed to cool undisturbed, a conical body of slag will result, in which, if broken up and examined, it will be found that those parts of the slag which form the outer surface of the mass, and were in contact with the iron, will, for the reason aforesaid, be much richer than the interior portion of the mass, which remained liquid for a longer period.

Now, I have discovered that by allowing the slag-buggy to stand for a few minutes after filling that the mattes, metal, &c., with the exception of that inclosed in the exterior layer, settles to the bottom of the pot almost completely, and that by drawing off the interior portion of the slag mass in the pot while still molten I am able to effect a very perfect separation between the rich slags and mattes and the poor slags. I accomplish this by means of a tap-hole or opening in the side walls of the slag-buggy.

Figs. 1 and 2 show a slag-buggy of the ordinary form. A is the pot or receiving-vessel, and *o* is the tap-hole or opening. This tap-hole may be of any convenient size or shape. In practice it is made circular with a diameter of about one to three inches. The position of the tap-hole above the bottom of the pot A will be regulated by the height to which it is found that the mattes will settle in the bottom. In Fig. 1 the dotted line is supposed to show the point to which they rise, and the tap-hole is so arranged that slags below that point will not be drawn off. It is immaterial how this tap-hole is closed. Fig. 3 shows a method of closing it by means of a cast-iron plug. Fig. 4 shows the hole made with a flange surrounding it for the purpose of facilitating closing it with fire-clay. It may be at any side of the pot; but in practice it will be found most convenient to place it at the front, as shown. In the case of slag-buggies now in use, the tap-hole may be simply drilled through the pot at the point shown by experiment to be most advantageous. Where in the process of smelting the amount of mattes or metals contained in the slag varies, it is advisable to vary the position of the tap-hole from time to time, according to the height to which the mattes, &c., settle in the bottom of the pot. This is accomplished with facility by making an elongated opening in the side walls of the pot, as shown in Fig. 5, and closing it with interchangeable and movable iron plates fitting into it containing each a tap-hole in a different position. These plates may be fastened by screws, as shown, or in any other manner, which will allow them to be conveniently removed and replaced when it is desired to tap higher up or lower down. The tap-holes in the plates may be closed in the same manner as before.

The operation of the buggy is as follows: The tap-hole having been carefully closed with fire-clay or closed with an iron plug, the buggy is wheeled up to the furnace and the slag tapped into it. It is then run off to the slag-dump, and allowed to settle and cool until the top surface of the slag becomes hard. The tap-hole is then opened by knocking out the plug or the fire-clay, and a sharp-pointed iron bar driven through the viscous crust which has been formed on the inner side walls of the pot into the still molten interior, which is allowed to flow out into any convenient mold or molds or over the waste-dump. When the slag ceases to run, the buggy is drawn off and allowed to cool. When cold, the rich slag and mattes, now in the form of a hollow cone, are dumped out and sent back to the furnace to be treated over again, or are broken up and subject to further separation by hand.

I claim as my invention—

1. In a slag-buggy, a receiving or slag pot having in its side walls a tap-hole in such position that the poor slag may be drawn off from the interior of the pot without carrying with it the rich slag, mattes, or metal in the bottom or on the sides of the pot.

2. In a slag-buggy, the combination, substantially as hereinbefore set forth, of the slag-pot, the tap-hole in the side walls of the same in such position that the poor slag may be drawn off at pleasure, and means, substantially as described, for closing said tap-hole.

3. In a slag-buggy, the combination, substantially as hereinbefore set forth, of the slag-pot, the tap-hole in the side walls of the same in such position that the poor slag may be drawn off at pleasure, a flange or collar surrounding said tap-hole, and an iron plug for closing the same.

4. In a slag-buggy, a receiving or slag pot having in its side walls an opening closed by interchangeable plates or sections, each provided with a tap-hole in different positions, whereby the contents of the pot can be drawn off at different points above the bottom according to the position of the tap-hole in the plate employed.

5. In a slag-buggy, the combination, substantially as hereinbefore set forth, of the slag-pot, the opening in the side walls of the same, the interchangeble plates or sections for closing the same provided each with a tap-hole in different positions, and means, substantially as described, for securing said plates and closing said tap-holes.

In testimony whereof I have hereunto subscribed my name this 4th day of November, 1884.

WALTER B. DEVEREUX.

In presence of—
 HERMAN PFEIFFER,
 ELMER T. BUTLER.